(12) United States Patent
Hoedt et al.

(10) Patent No.: US 10,668,928 B2
(45) Date of Patent: Jun. 2, 2020

(54) METHOD AND DEVICE FOR ESTIMATING THE FRICTION VALUES OF A WHEEL OF A VEHICLE AGAINST A SUBSTRATE

(71) Applicant: VOLKSWAGEN AG, Wolfsburg (DE)

(72) Inventors: Jens Hoedt, Hannover (DE); Kristof Van Ende, Braunschweig (DE)

(73) Assignee: Volkswagen AG (DE)

( * ) Notice: Subject to any disclaimer, the term of this patent is extended or adjusted under 35 U.S.C. 154(b) by 183 days.

(21) Appl. No.: 15/668,003

(22) Filed: Aug. 3, 2017

(65) Prior Publication Data
US 2018/0037234 A1    Feb. 8, 2018

(30) Foreign Application Priority Data

Aug. 5, 2016    (DE) ........................ 10 2016 214 574

(51) Int. Cl.
*B60W 40/068*    (2012.01)
*B60T 8/172*    (2006.01)
(Continued)

(52) U.S. Cl.
CPC ........... *B60W 40/068* (2013.01); *B60T 8/172* (2013.01); *G01M 17/02* (2013.01); *G05D 1/0891* (2013.01);
(Continued)

(58) Field of Classification Search
CPC .. B60W 40/068; B60T 8/172; B60T 2210/12; B60T 2240/06; B60T 2250/03; G01M 17/02; G05D 1/0891; G01L 5/20
See application file for complete search history.

(56) References Cited

U.S. PATENT DOCUMENTS 7,778,809 B2 *    8/2010    Miyashita ............. B60C 99/006
                                                    703/2
10,227,064 B2 *    3/2019    Serra ................... B60T 8/17636
(Continued)

FOREIGN PATENT DOCUMENTS

DE    102007039176 A1    2/2009
DE    102014201564 A1    7/2015
(Continued)

OTHER PUBLICATIONS

Search Report for German Patent Application No. 10 2016 214 574.6; dated Jun. 2, 2017.

*Primary Examiner* — Anthony R Jimenez
(74) *Attorney, Agent, or Firm* — Barnes & Thornburg LLP

(57) ABSTRACT

A method and a device for estimating coefficients of friction of a wheel of a vehicle with respect to an underlying surface including decomposing a supplied trajectory into individual curve segments, estimating a lateral force and a slip angle for a front axle of the vehicle, assigning respectively estimated lateral forces and slip angles relating to the associated individual curve segments and storing these value pairs in a memory, estimating a tire characteristic curve for each of the curve segments based on the value pairs stored for the respective curve segment in the memory, estimating a coefficient of friction for each curve segment based on the respectively estimated tire characteristic curve, and storing the estimated coefficients of friction relating to the respectively associated curve segments in a coefficient of friction map.

16 Claims, 7 Drawing Sheets

(51) Int. Cl.
*G01M 17/02* (2006.01)
*G05D 1/08* (2006.01)
*G01L 5/20* (2006.01)

(52) U.S. Cl.
CPC ....... *B60T 2210/12* (2013.01); *B60T 2230/02* (2013.01); *B60T 2240/06* (2013.01); *B60T 2250/03* (2013.01); *B60T 2270/86* (2013.01); *B60W 2520/125* (2013.01); *B60W 2520/14* (2013.01); *B60W 2520/20* (2013.01); *B60W 2530/20* (2013.01); *G01L 5/20* (2013.01)

(56) References Cited

U.S. PATENT DOCUMENTS

| | | |
|---|---|---|
| 2006/0190158 A1 | 8/2006 | Shiiba et al. |
| 2010/0114449 A1 | 5/2010 | Shiozawa et al. |
| 2017/0210380 A1* | 7/2017 | Hegemann ............ B60W 30/09 |

FOREIGN PATENT DOCUMENTS

| | | |
|---|---|---|
| DE | 102014012685 A1 | 2/2016 |
| DE | 102014219493 A1 | 3/2016 |

* cited by examiner

METHOD AND DEVICE FOR ESTIMATING THE FRICTION VALUES OF A WHEEL OF A VEHICLE AGAINST A SUBSTRATE

PRIORITY CLAIM

This patent application claims priority to German Patent Application No. 10 2016 214 574.6, filed Aug. 5, 2016, the disclosure of which is incorporated herein by reference in its entirety.

SUMMARY

Illustrative embodiments relate to a method and to a device for estimating coefficients of friction of a wheel of a vehicle with respect to an underlying surface.

BRIEF DESCRIPTION OF THE DRAWINGS

The disclosed embodiments will be explained in more detail below with reference to the figures in which.

DETAILED DESCRIPTION

Figure 1:
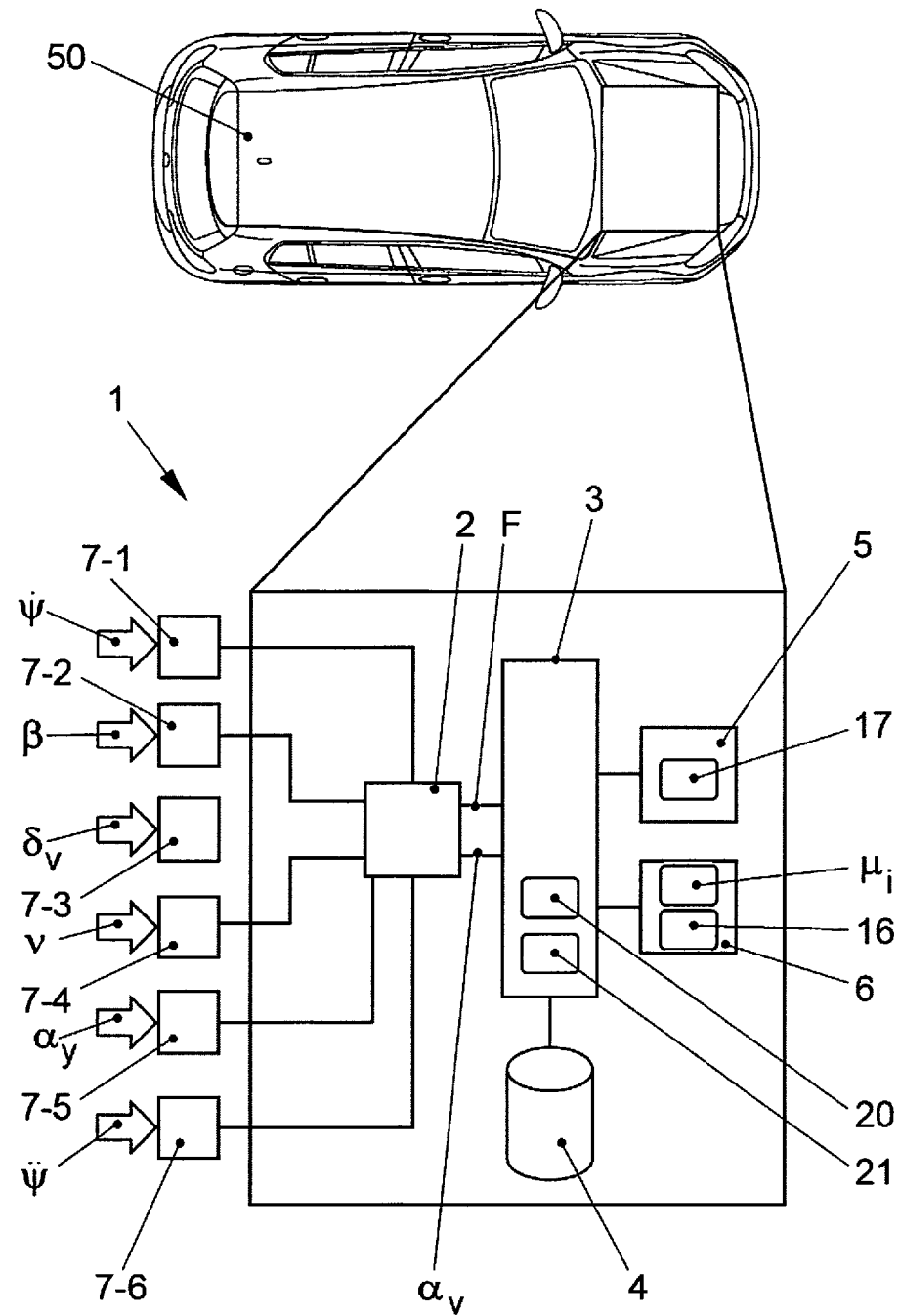
FIG. 1 shows a schematic illustration of an embodiment of a device for estimating coefficients of friction of a wheel of a vehicle with respect to an underlying surface.

To improve the quality of vehicle control, it may be desirable in vehicles which are to be driven in an automated manner to have available a current coefficient of friction between the wheels of the vehicle and an underlying surface. For this purpose, a working point in a tire characteristic curve is generally determined based on vehicle movement dynamic variables from currently available data and a current coefficient of friction is estimated therefrom. However, as a result of inaccuracies in the available measurement variables a region results in which the estimated coefficient of friction can vary. Considering only the current state therefore gives rise to an, in some cases, imprecise and less robust estimate of the coefficient of friction.

DE 10 2007 039 176 A1 discloses a method for determining the coefficient of friction of a vehicle tire with respect to the underlying surface, wherein using a tire model composed of at least a first vehicle movement dynamic variable and of an estimated value for the coefficient of friction an estimated value is calculated for a second vehicle movement dynamic variable, wherein the calculated estimated value for the second vehicle movement dynamic variable is compared with a measured value of the second vehicle movement dynamic variable, wherein the estimated value which is assumed for the coefficient of friction is corrected by means of the comparison result, wherein the operations described above for the iterative correction of the estimated value which is assumed for the coefficient of friction are repeated cyclically, and wherein the operations described above are each carried out based on a first initial estimated value selected as a lower limit and based on a second initial estimated value selected as an upper limit. Furthermore, a device is described which comprises a calculation unit which is configured to carry out the method.

DE 10 2014 012 685 A1 discloses a method for actively estimating lateral forces and coefficients of friction, which method performs a defined steering movement at one or more vehicle wheels and uses the resulting movement variables in relation to a reference state to obtain information about the lateral force potential at one or more vehicle wheels. The wheels at a random vehicle axle are firstly moved into a straight-ahead position depending on the driving situation. This state serves as a reference state. Subsequently, the wheels are deflected in opposite directions. By considering the longitudinal force and the yaw moment which occur, the lateral forces occurring at the wheels are estimated. In at least one disclosed embodiment, the longitudinal forces which are caused by the method and the yaw moment which acts on the vehicle are compensated by means of regulators. The drive torque of the vehicle and the steering angle of one or more wheels and alternatively or additionally a drive torque distribution are used for the regulating process. The result of the lateral force estimation can be used to estimate the coefficient of friction of the underlying surface. The method presented can be used in vehicles with active track adjustment or a single-wheel-steered steer-by-wire system.

DE 10 2014 201 564 A1 discloses a method for determining coefficients of friction of sections of an underlying surface or road segments of a trajectory of a vehicle lying ahead of the vehicle, wherein information on the coefficient of friction is received in a wireless manner from a vehicle-external database and the coefficients of friction are determined therefrom.

The disclosed embodiments are based on the technical problem of providing a method and a device for estimating coefficients of friction of a wheel of a vehicle with respect to an underlying surface, in which method and device the estimation of the coefficient of friction is improved.

A method for estimating coefficients of friction of a wheel of a vehicle with respect to an underlying surface is made available, comprising the following operations: decomposing a supplied trajectory into individual curve segments by means of a controller, estimating a lateral force and a slip angle for a front axle of the vehicle by means of a state estimating device using a one-track model taking into account state variables of the vehicle detected by at least one sensor when traveling through the respective curve segment, assigning respectively estimated lateral forces and slip angles relating to the associated individual curve segments and storing these value pairs in a memory by means of the controller, estimating a tire characteristic curve for each of the curve segments based on the value pairs stored for the respective curve segment in the memory, by means of a characteristic curve estimating device, estimating a coefficient of friction for each curve segment based on the respectively estimated tire characteristic curve by means of a coefficient of friction estimating device, and storing the estimated coefficients of friction relating to the respectively associated curve segments in a coefficient of friction map by means of the controller.

In addition, a device for estimating coefficients of friction of a wheel of a vehicle with respect to an underlying surface is provided, comprising a controller for decomposing a supplied trajectory into individual curve segments, a memory, a state estimating device for estimating a lateral force and a slip angle for a front axle of the vehicle using a one-track model taking into account state variables of the vehicle detected by means of at least one sensor when traveling through the respective curve segment, wherein the controller is designed to assign estimated lateral forces and slip angles in each case to the associated individual curve segments and to store the assignment in the memory, a characteristic curve estimating device for estimating a tire characteristic curve for each curve segment based on the pairs of estimated lateral forces and slip angles stored for the respective curve segment in the memory, a coefficient of friction estimating device which is designed to estimate a coefficient of friction based on the estimated tire characteristic curve for the respectively associated curve segment, and wherein the controller is also designed to store the estimated coefficients of friction relating to the respectively associated curve segments in a coefficient of friction map.

The core concept is to decompose a trajectory which is to be driven through in an automated manner into individual curve segments and to estimate a tire characteristic curve for the respective curve segment based on pairs of slip angles and lateral forces which are estimated on an up-to-date basis for the individual curve segments. For this purpose, the pairs of estimated slip angles and lateral forces are stored in a memory, and the tire characteristic curve is adapted (fitted) to the corresponding profile by means of an optimization method. Based on the tire characteristic curve which is estimated for a curve segment, at least one coefficient of friction for the curve segment is then subsequently estimated. The coefficients of friction which are respectively estimated for the individual curve segments are stored in a coefficient of friction map. In contrast to exclusively considering the current time, the disclosed method provides an increased level of robustness and accuracy of the estimation of the coefficient of friction.

The vehicle may be a motor vehicle. Furthermore, the vehicle may also be a vehicle with wheels controlled in a different manner or driving in an automated manner, however, for example, a robot.

In at least one disclosed embodiment there is provision that the slip angle is estimated from a yaw rate, a side slip angle, a centroid velocity and a steering angle. For example, these state variables are detected using sensors which are correspondingly embodied on the vehicle, and are subsequently further processed in the controller, with the result that the slip angle is calculated. For example, current measured values for these state variables are made available by electronic stability control (ESP etc.) devices which are installed on a series basis in modern vehicles. In the simple one-track model, the slip angle $\alpha v$ of the front wheels can then be calculated as follows:

$$\alpha_v = \beta - \frac{l_v}{v}\dot{\psi} + \delta_v$$

where $\beta$ is the side slip angle $l_v$ is the distance between the front axle and the center of gravity of the vehicle, v is the centroid velocity, $\dot{\psi}$ is the yaw rate and $\delta_v$ is the steering angle (also referred to as the wheel steering angle in the literature).

Of course, the slip angle can also be determined differently based on relatively complex models into which more state variables are input.

In a further disclosed embodiment there is provision that the lateral force is estimated from the lateral acceleration and the yaw acceleration. For example, these state variables are detected using sensors which are correspondingly embodied on the vehicle and subsequently further processed in the controller, with the result that the lateral force is calculated. For example, current measured values for these state variables are made available by electronic stability control (ESP etc.) devices which are installed on a series basis in modern vehicles. In the (non-linear) one-track model the lateral force F acting on the front wheels is then calculated according to the following formula:

$$F = \frac{l_h}{l}ma_y + \frac{J_z}{l}\ddot{\psi}$$

where $l_h$ is the distance between the rear axle and the center of gravity of the vehicle, l is the distance between the front axle and the rear axle of the vehicle (wheel base), m is the mass of the vehicle, $a_y$ is the lateral acceleration of the vehicle, $J_z$ is the moment of inertia of the vehicle with respect to a vertical rotational axis at the center of gravity of the vehicle, and is the yaw acceleration.

Of course, the lateral force can also be determined differently based on relatively complex models into which more state variables are input.

In a further disclosed embodiment there is provision that the tire characteristic curve is modeled by means of a Pacejka tire characteristic curve. The Pacejka tire characteristic curve forms an empirically established relationship between various input variables (e.g., the normal force acting on the tire and the slip angle) and various output variables (e.g., the lateral force) at a tire which corresponds well to reality, with the result that the behavior of a tire can be estimated well in this way. Generally, the formula for the Pacejka tire characteristic curve is as follows:

$$y = D \sin[C \tan^{-1}\{Bx - E(Bx - \tan^{-1}(Bx))\}]$$

where:

$$Y(X) = y(x) + S_V$$

and $$x = X + S_H$$

where Y is the dependent variable, here, for example, a lateral force F, x is the independent variable, here, for example, the slip angle, B is the rigidity of the tire, C is a form factor, D is the maximum value, E is a curvature factor and $S_H$ and $S_V$ are a horizontal offset and a vertical offset. The coefficient of friction $\mu$ is also input into the maximum value D, with the result that given knowledge of the estimated tire characteristic curve and of a normal force acting on the tire the coefficient of friction $\mu$ can be calculated therefrom.

In addition, it can also be provided that the coefficient of friction $\mu$ is estimated based on a reference tire characteristic curve.

In principle, the model can also be formed in different ways for the Pacejka tire characteristic curve, however, in a relatively complex way by taking into account further coefficients.

In addition, in principle it is also possible to use a different tire model and therefore a different tire characteristic curve. For example, the Burckhardt model or the Kiencke model can also be used for modeling the tire behavior here.

In a further disclosed embodiment there is provision that the adaptation of the Pacejka tire characteristic curve to the stored value pairs is carried out by means of a linear optimization method. This is beneficial with respect to the necessary computational complexity since the complexity can be reduced.

In another disclosed embodiment there is provision that the adaptation of the Pacejka tire characteristic curve to the stored value pairs is carried out by means of a non-linear optimization method.

In a further disclosed embodiment there is provision that the decomposition of the supplied trajectory into individual curve segments is carried out at least partially before the supplied trajectory is traveled through. This makes it possible to decompose the supplied trajectory into individual curve segments even before the journey, by means of an "offline" decomposition. This can be beneficial with respect to efficient use of existing computational capacity, for example, if such a decomposition is carried out when the vehicle is not being used in other ways and therefore all the computational capacity, for example, of an on-board computer, is available for segmenting the trajectory.

In addition, in a further disclosed embodiment there can also be provision that the decomposition of the supplied trajectory into individual curve segments is carried out at least partially during travel through the supplied trajectory. By means of this "online" decomposition it is also always possible to react to a current change in the supplied trajectory, with the result that the currently supplied trajectory is always decomposed.

In at least one disclosed embodiment there is provision that after the estimation of the respective tire characteristic curve a validation process is carried out, wherein the values of the tire characteristic curve are checked for their plausibility. For example, the fit parameters for the estimated tire characteristic curve can be checked to determine whether they lie in a plausible range. The validation can be carried out, for example, by means of the controller.

For example, within the scope of such validation it is possible to take into account additional information such as, for example, information about the current weather. Therefore, the values for the coefficient of friction on dry asphalt are, for example, $\mu=1$, in the case of snow approximately $\mu=0.5$ and in the case of ice on the underlying surface they are approximately $\mu=0.1$. Likewise, tire characteristic curves which are already known, such as, for example, reference characteristic curves which have been determined under known or predetermined test conditions, or tire characteristic curves which have been estimated for the same curve segment at previous times, can be used for reconciliation with the estimated tire characteristic curve.

FIG. 1 shows a schematic illustration of an embodiment of a device 1 for estimating coefficients of friction $\mu$ of a wheel of a vehicle 50 with respect to an underlying surface. The device 1 comprises a state estimating device 2, a controller 3, a memory 4, a characteristic curve estimating device 5 and a coefficient of friction estimating device 6. All the devices 2, 4, 5, 6 are actuated, for example, by the controller 3.

The controller 3 decomposes a supplied trajectory 20 into individual curve segments 21. The supplied trajectory 20 can be stored, for example, in the memory 4, and can be retrieved therefrom by the controller 3 and supplied or supplied by a navigation system. Subsequently, the state estimating device 2 estimates, using a one-track model, a lateral force F and a slip angle $\alpha v$ taking into account state variables of the vehicle 50 detected by the sensors 7-1 to 7-6 when traveling through the respective curve segment 21. For example, the slip angle $\alpha v$ can be calculated from a detected yaw velocity $\dot\psi$, a detected side slip angle $\beta$, a detected centroid velocity v and a detected steering angle $\delta v$. The lateral force F can be calculated, for example, from a lateral acceleration ay and a yaw acceleration $\ddot\psi$. The estimated lateral force F and the estimated slip angle $\alpha v$ are passed on to the controller 3 by the state estimating device 2. The controller 3 assigns the value pairs composed of estimated lateral forces F and estimated slip angles $\alpha v$ to the associated individual curve segments 21 of the supplied trajectory and stores these value pairs in the memory 4.

Based on the value pairs stored for the respective curve segment 21 in the memory 4, the characteristic curve estimating device 5 estimates a tire characteristic curve 17 for the respective curve segment 21. The estimation of the tire characteristic curve 17 can be carried out, for example, by fitting a Pacejka tire characteristic curve to the set of value pairs, wherein linear or non-linear optimization methods can be used.

After the estimation of the tire characteristic curve 17 or tire characteristic curves 17 the coefficient of friction estimating device 6 estimates a coefficient of friction $\mu i$ based on the respectively estimated tire characteristic curve 17 for each curve segment 21. The coefficients of friction $\mu i$ which are estimated for each curve segment 21 are stored by the controller 3 in relation to the respectively associated curve segments 21 in a coefficient of friction map 16. In this way, a coefficient of friction map 16 is produced in which each curve segment 21 is assigned a current coefficient of friction $\mu i$. An increased level of robustness and accuracy when estimating the coefficients of friction $\mu i$ is provided by the disclosed method, since a tire characteristic curve 17 which is estimated on an up-to-date basis for each curve segment 21 is always taken into account during the estimation of the coefficients of friction $\mu i$.

Figure 2:
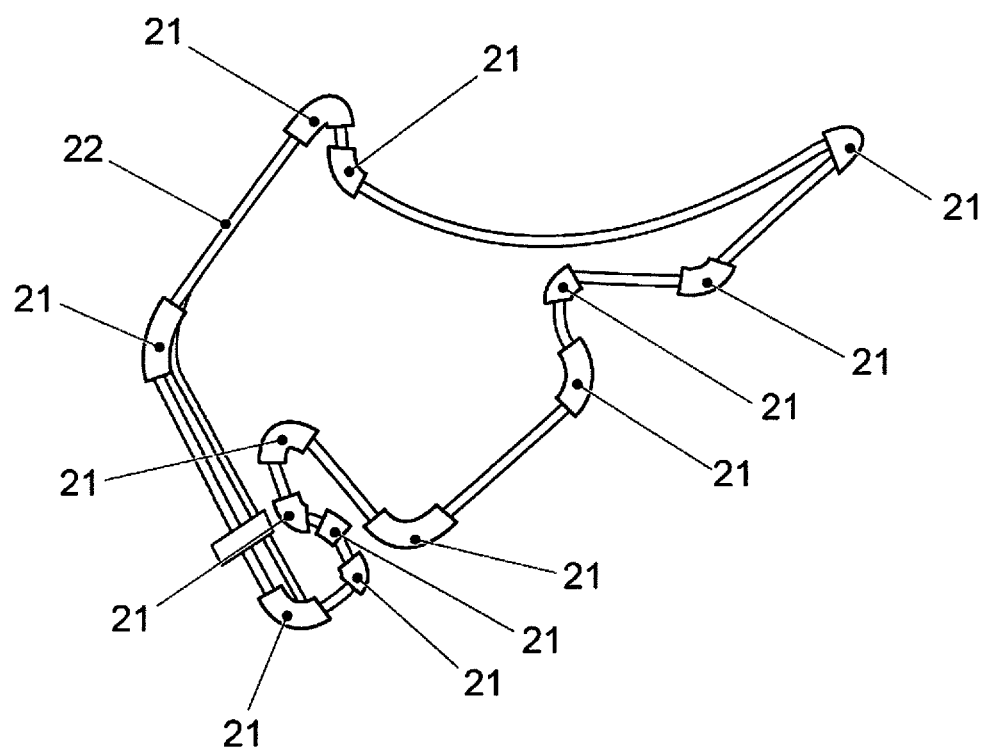
FIG. 2 shows a schematic illustration of a supplied trajectory which has been decomposed into individual curve segments.

FIG. 2 shows a supplied trajectory 20 which has been decomposed into individual curve segments 21. The curve segments 21 of the trajectory 20 are detected, for example, by the controller by means of a minimum curvature radius. In each of the curve segments 21, both lateral forces and slip angles are estimated in a model-based manner during the individual steering turning-in processes and stored in a memory. In this way, a set of value pairs of lateral forces and slip angles is produced. The detection of the entries to curves or the segmentation of the trajectory 20 into individual curve segments 21 can be carried out both before traveling through the trajectory 20 and during travel through the trajectory 20.

Figure 3:
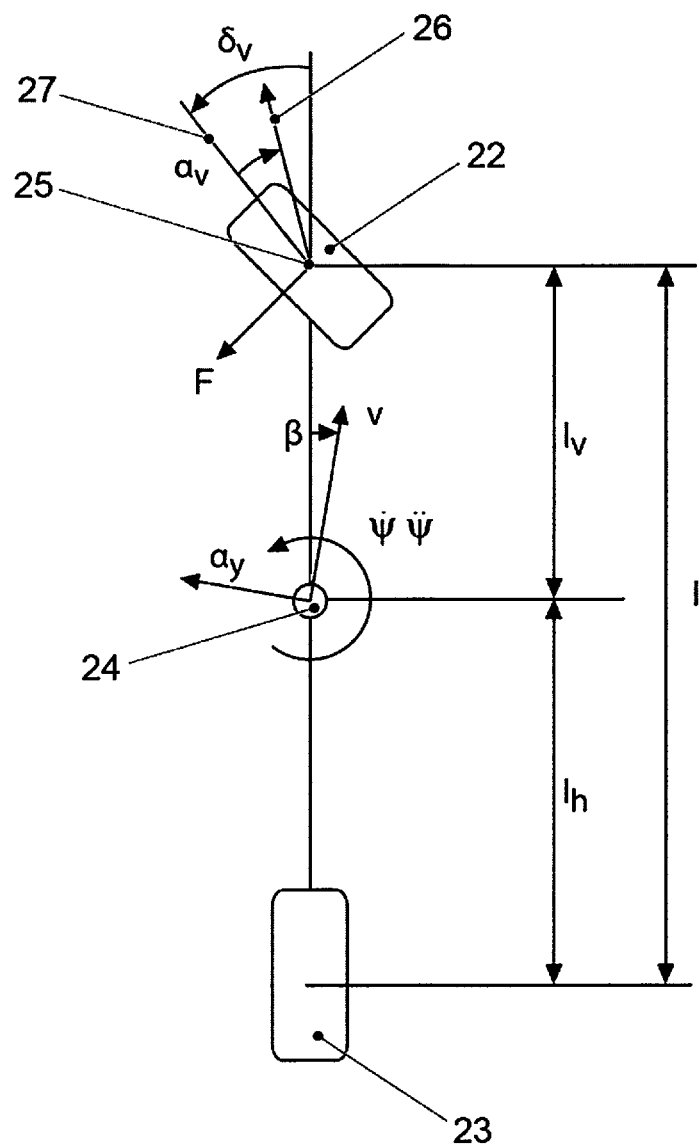
FIG. 3 shows a schematic illustration explaining the one-track model for estimating a slip angle and a lateral force.

FIG. 3 shows a schematic illustration explaining the one-track model for estimating a slip angle and a lateral force. The one-track model is a simple model for explaining the steady-state and non-steady-state lateral dynamics of two-track vehicles. In this context it is assumed that the vehicle is steered at the front axle. In addition it is assumed that both wheels of the front axle are combined to form a front wheel 22 and both wheels of the rear axle are combined to form a single rear wheel 23. The front wheel 22 is at a distance l here, referred to as the wheel base, from the rear wheel 23. The center of gravity 24 of the vehicle is located between the front wheel 22 and the rear wheel 23. The center of gravity 24 of the vehicle is at a distance lv from the front wheel 22 and a distance lH from the rear wheel 23. The slip angle αv is the angle between the speed vector 26 at the wheel contact point 25 and the line of intersection between the wheel center plane 27 and the plane of the underlying surface. The slip angle αv can be calculated from the side slip angle β, the centroid velocity v, the yaw rate $\dot{\psi}$ and the steering angle δv according to the following formula:

$$\alpha_v = \beta - \frac{l_v}{v}\dot{\psi} + \delta_v$$

In this context the state variables of the side slip angle β, centroid velocity v, yaw rate $\dot{\psi}$ and steering angle δv are detected and supplied, for example, by means of sensors which are correspondingly embodied on the vehicle. The lateral force F acting on the front wheel can be calculated, for example, from a lateral acceleration ay and a yaw acceleration $\ddot{\psi}$ using the following formula:

$$F = \frac{l_h}{l}ma_y + \frac{J_z}{l}\ddot{\psi}$$

Here, m represents a vehicle mass of the vehicle, and Jz represents a moment of inertia of the vehicle with respect to a rotation about a rotational axis perpendicular to the plane of the paper about the center of gravity of the vehicle. The slip angles αv and lateral forces F estimated in this way are then used as current value pairs for estimating a tire characteristic curve for the lateral force F.

Figure 4:
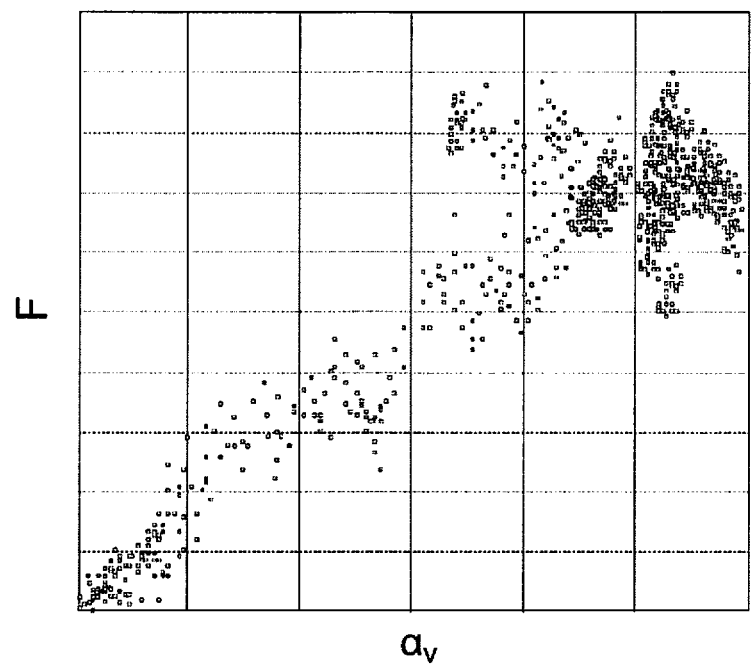
FIG. 4 shows a schematic illustration of a multiplicity of value pairs each composed of an estimated lateral force and an estimated slip angle.

FIG. 4 shows a schematic illustration of a multiplicity of such value pairs, each composed of an estimated lateral force F and an estimated slip angle αv. In this context, the lateral force F is plotted on the y axis and the slip angle αv on the x axis.

Figure 5:
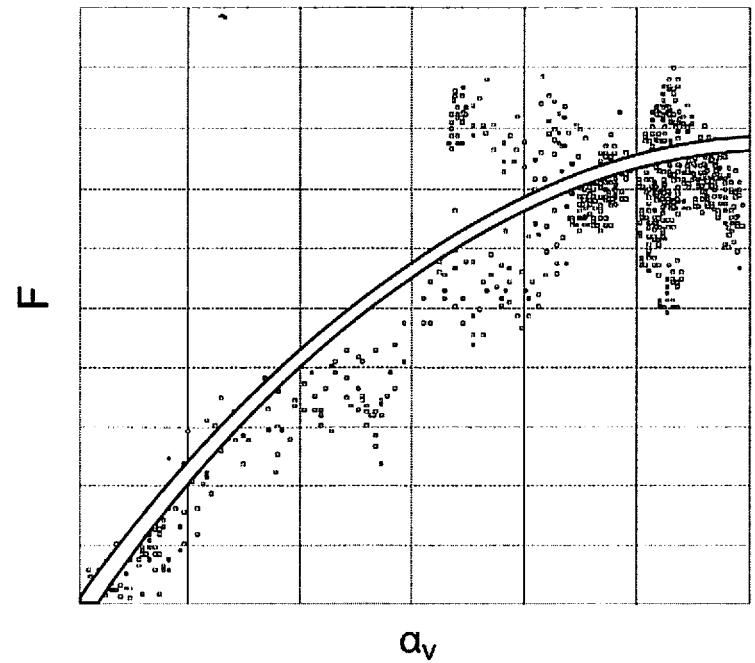
FIG. 5 shows a schematic illustration of a fit function adapted to the multiplicity of the value pairs of FIG. 4.

FIG. 5 shows a schematic illustration of a fit function which is adapted to the multiplicity of the value pairs from FIG. 4. Such a fit function can be, for example, a Pacejka tire characteristic curve for the lateral force F.

Figure 6:
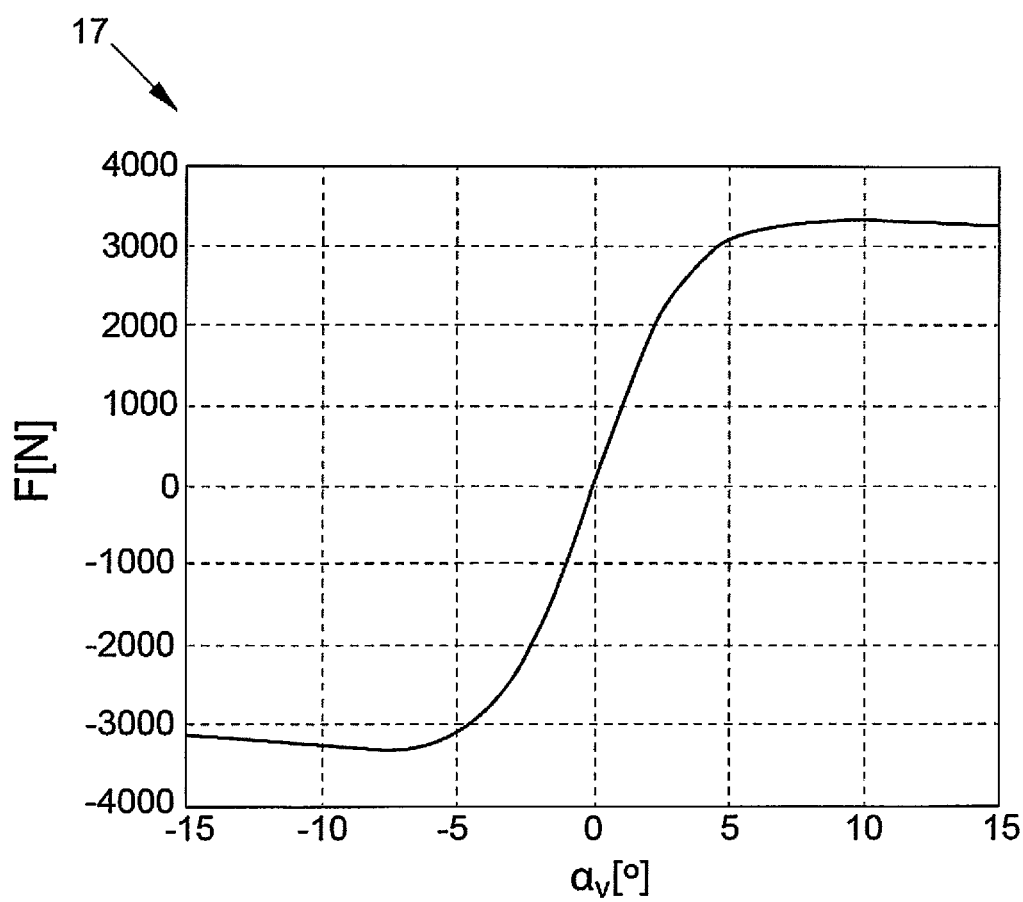
FIG. 6 shows a schematic illustration of an exemplary Pacejka tire characteristic curve for the lateral force.

FIG. 6 shows a schematic illustration of an exemplary tire characteristic curve 17 according to Pacejka for the lateral force F. Here, the lateral force F is plotted on the y axis, and the slip angle αv is plotted on the x axis. The formula for the Pacejka tire characteristic curve is generally as follows:

$$y = D \sin[C \tan^{-1}\{Bx - E(Bx - \tan^{-1}(Bx))\}]$$

where:

$$Y(X) = y(x) + S_V$$

and $$x = X + S_H$$

where Y is the dependent variable, here, for example, a lateral force F, x is the independent variable, here, for example, the slip angle, B is the rigidity of the tire, C is a form factor, D is the maximum value, E is a curvature factor and $S_H$ and $S_V$ are a horizontal offset and a vertical offset. The coefficient of friction μ is also input into the maximum value D, with the result that given knowledge of the estimated Pacejka tire characteristic curve and a normal force $F_z$ acting on the tire it is possible to calculate the coefficient of friction μ therefrom.

If the Pacejka tire characteristic curves 17 for the individual curve segments of the trajectory are estimated, a coefficient of friction relating to the respectively associated curve segments can be estimated from the estimated Pacejka tire characteristic curves. The estimated coefficients of friction relating to the respectively associated curve segments are subsequently assigned to the curve segments and stored in a coefficient of friction map.

Figure 7:
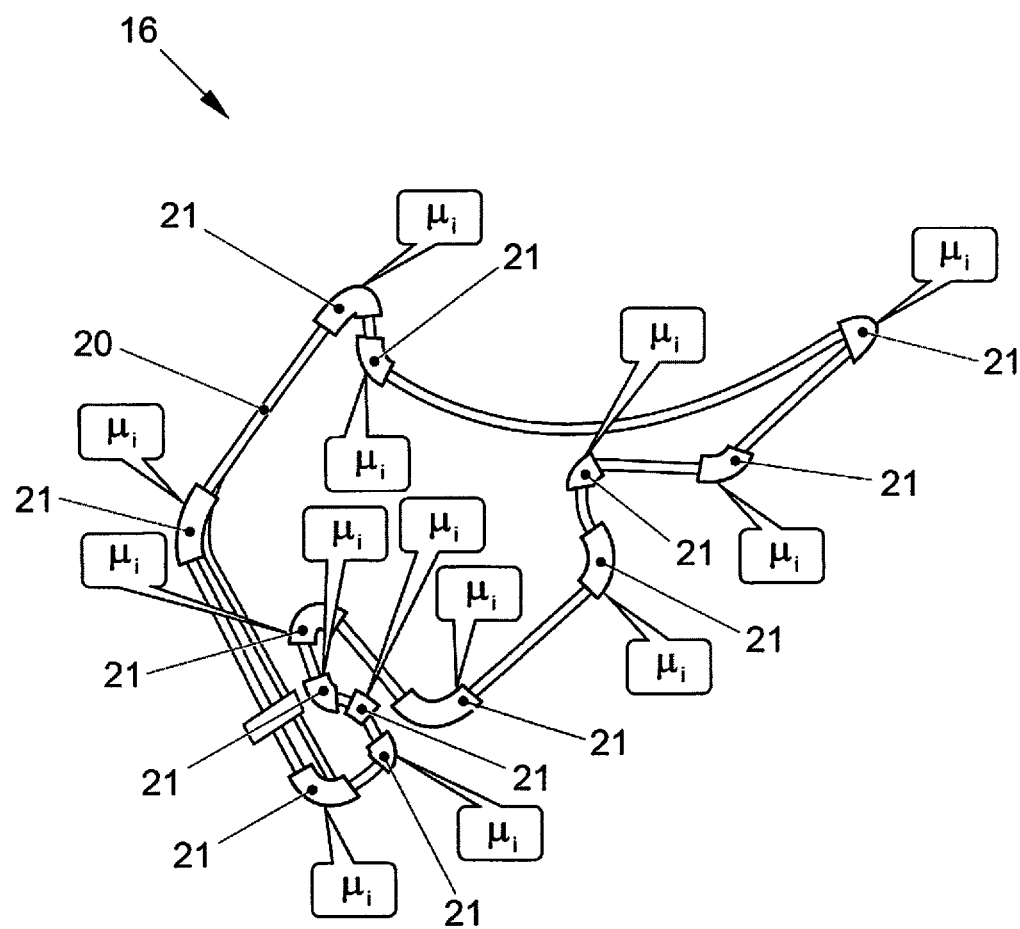
FIG. 7 shows a schematic illustration of a coefficient of friction map.

Such a coefficient of friction map 16 is shown schematically in FIG. 7. Here, each of the curve segments 21 of the trajectory 20 is respectively assigned a coefficient of friction μi. The coefficients of friction μi stored for the individual curve segments 21 of the trajectory 20 can be updated, for example, at every journey of the vehicle which is carried out in an automated manner. In addition it is possible to validate the coefficients of friction μi estimated on an up-to-date basis from the currently estimated Pacejka tire characteristic curves by means of previously estimated coefficients of friction or by means of a stored reference characteristic curve. In this context, reconciliation takes place between the currently estimated coefficients of friction μi and value ranges which are plausible for these estimated coefficients of friction μi.

Figure 8:
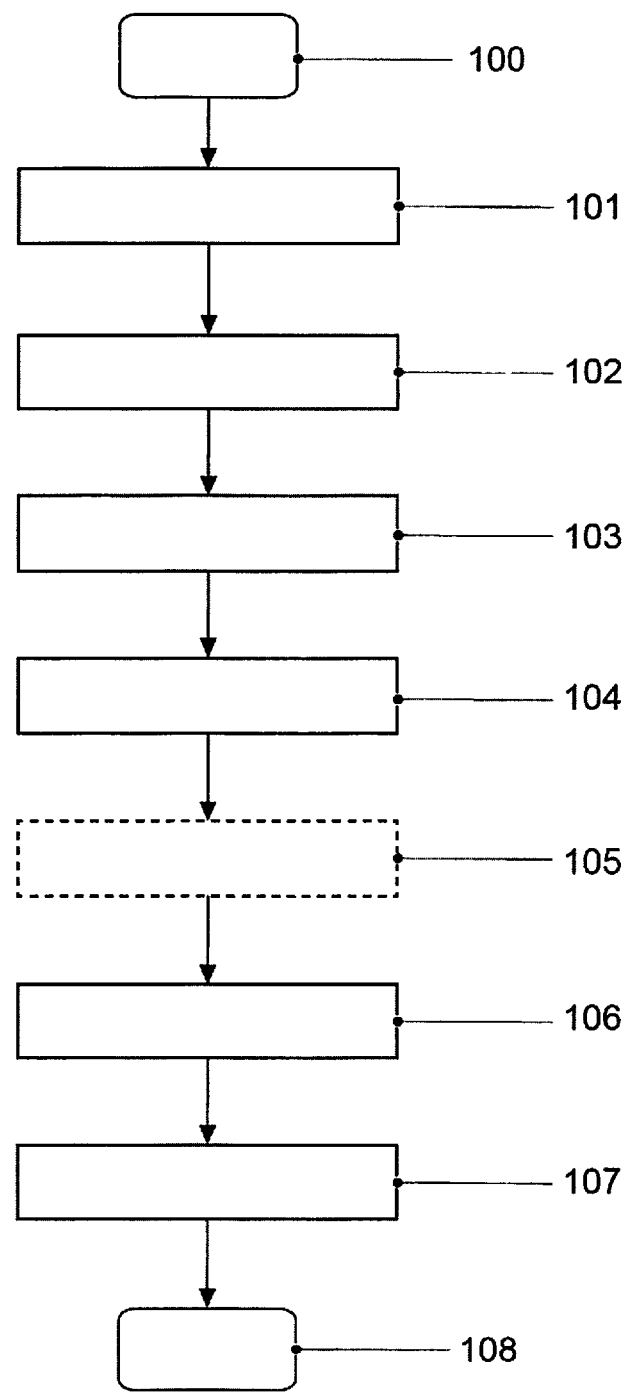
FIG. 8 shows a schematic flowchart of an embodiment of the method for estimating coefficients of friction of a wheel of a vehicle with respect to an underlying surface.

FIG. 8 shows a schematic flowchart of an embodiment of the method for estimating coefficients of friction of a wheel of a vehicle with respect to an underlying surface. After the start 100 of the method a supplied trajectory is decomposed into individual curve segments by means of a controller in a first method operation 101. This can be carried out both partially before and partially during the travel through the supplied trajectory by the motor vehicle. In the subsequent method operation 102, a lateral force and a slip angle for a front axle of the vehicle are estimated by means of a state estimating device using a one-track model taking into account state variables of the vehicle detected by at least one sensor when traveling through the respective curve segment. The state variables for estimating the slip angle can be, for example, a side slip angle, a yaw rate and a steering angle. The state variables for estimating the lateral force can be, for example, a yaw acceleration and a lateral acceleration. After the estimation of the lateral force and the slip angles, the value pairs in the method operation 103 are assigned to the individual curve segments. For this purpose, the estimated value pairs are stored in a memory by means of the controller. In the method operation 104, a tire characteristic curve is estimated for each of the curve segments by means of a characteristic curve estimating device based on the value pairs stored for the respective curve segment in the memory, the value pairs consisting of lateral force and slip angle. In the method operation 105, the tire characteristic curves which are estimated for the individual curve segments can subsequently be validated based on a reference characteristic curve or based on a plausibility check by means of value ranges which are expected for the respective curve segment. For example, the model by Pacejka for the lateral force as a function of the slip angle can be used as a model for the tire characteristic curve. In the method operation 106, in each case a coefficient of friction for the curve segment is estimated for each curve segment by means of a coefficient of friction estimating device based on the respectively estimated tire characteristic curve. In the last method operation 107, the estimated coefficients of friction are stored in relation to the respectively associated curve segments in a coefficient of friction map by means of the controller. The method is subsequently ended at 108.

LIST OF REFERENCE SYMBOLS

1 Device
2 State estimating device

3 Controller
4 Memory
5 Characteristic curve estimating device
6 Coefficient of friction estimating device
7-1 to 7-6 Sensors
16 Coefficient of friction map
17 Tire characteristic curve
20 Trajectory
21 Curve segment
22 Front wheel
23 Rear wheel
24 Center of gravity of vehicle
25 Wheel distance point
26 Speed vector
27 Wheel center
50 Vehicle
l Distance (wheel base)
$l_v$ Distance
$l_h$ Distance
$\alpha_v$ Slip angle
$\delta_v$ Steering angle
$\beta$ Side slip angle
v Centroid velocity
$\dot{\psi}$ Yaw rate
F Lateral force
$\ddot{\psi}$ Yaw acceleration
$\alpha_y$ Lateral acceleration
$j_z$ Moment of inertia
m Vehicle mass
D Maximum value
$F_z$ Normal force
µCoefficient of friction
µi Coefficient of friction

The invention claimed is:

1. A method for estimating coefficients of friction of a wheel of a vehicle with respect to an underlying surface, the method comprising:
   decomposing a supplied trajectory into individual curve segments by a controller;
   estimating a lateral force and a slip angle for a front axle of the vehicle by a state estimating device using a one-track model taking as inputs state variables of the vehicle detected by at least one sensor when traveling through each curve segment, wherein the lateral force is estimated from the state variables of lateral acceleration and yaw acceleration for each curve segment;
   assigning respective estimated lateral forces and slip angles relating to the associated individual curve segments as value pairs and storing these value pairs in a memory by the controller;
   estimating a tire characteristic curve for each of the curve segments based on the value pairs stored for the respective curve segment in the memory, a characteristic curve estimating device;
   estimating a coefficient of friction for each curve segment based on the respective estimated tire characteristic curve by a coefficient of friction estimating device; and
   storing the estimated coefficients of friction relating to the respective associated curve segments in a coefficient of friction map by the controller.

2. The method of claim 1, wherein the slip angle is estimated from a yaw rate, a side slip angle, a centroid velocity and a steering angle.

3. The method of claim 1, wherein the decomposition of the supplied trajectory into individual curve segments is carried out at least partially before the supplied trajectory is traveled through.

4. The method of claim 1, wherein the decomposition of the supplied trajectory into individual curve segments is carried out at least partially during travel through the supplied trajectory.

5. The method of claim 1, wherein, after the estimation of the respective tire characteristic curve, a validation process is carried out, wherein the values of the tire characteristic curve are checked for their plausibility.

6. The method of claim 1, wherein the tire characteristic curve is modeled by a Pacejka tire characteristic curve.

7. The method of claim 6, wherein adaptation of the Pacejka tire characteristic curve to the stored value pairs is carried out by a linear optimization method.

8. The method of claim 6, wherein adaptation of the Pacejka tire characteristic curve to the stored value pairs is carried out by a non-linear optimization method.

9. A device for estimating coefficients of friction of a wheel of a vehicle with respect to an underlying surface, the device comprising:
   a controller for decomposing a supplied trajectory into individual curve segments;
   a memory;
   a state estimating device for estimating a lateral force and a slip angle for a front axle of the vehicle using a one-track model taking as inputs state variables of the vehicle detected by at least one sensor when traveling through each curve segment, wherein the lateral force is estimated from the state variables of lateral acceleration and yaw acceleration for each curve segment, and wherein the controller assigns estimated lateral forces and slip angles to associated individual curve segments and stores the assignment in the memory;
   a characteristic curve estimating device for estimating a tire characteristic curve for each curve segment based on pairs of estimated lateral forces and slip angles stored for the respective curve segment in the memory; and
   a coefficient of friction estimating device to estimate a coefficient of friction based on the estimated tire characteristic curve for the respective associated curve segment,
   wherein the controller also stores the estimated coefficients of friction relating to the respective associated curve segments in a coefficient of friction map.

10. The device of claim 9, wherein the slip angle is estimated from a yaw rate, a side slip angle, a centroid velocity and a steering angle.

11. The device of claim 9, wherein the decomposition of the supplied trajectory into individual curve segments is carried out at least partially before the supplied trajectory is traveled through.

12. The device of claim 9, wherein the decomposition of the supplied trajectory into individual curve segments is carried out at least partially during travel through the supplied trajectory.

13. The device of claim 9, wherein, after the estimation of the respective tire characteristic curve, a validation process is carried out, wherein the values of the tire characteristic curve are checked for their plausibility.

14. The device of claim 9, wherein the tire characteristic curve is modeled by a Pacejka tire characteristic curve.

15. The device of claim 14, wherein adaptation of the Pacejka tire characteristic curve to the stored value pairs is carried out by a linear optimization method.

16. The device of claim 14, wherein adaptation of the Pacejka tire characteristic curve to the stored value pairs is carried out by a non-linear optimization method.

* * * * *